United States Patent
Vasselin et al.

(10) Patent No.: US 8,193,773 B2
(45) Date of Patent: Jun. 5, 2012

(54) ELECTRONIC SYSTEM FOR A BATTERY

(75) Inventors: Benoît Vasselin, Carbon Blanc (FR); Philippe Desprez, Le Taillan Medoc (FR); Philippe Genin, Bordeaux (FR); Christophe Morin, Beruges (FR); Sébastien Benjamin, Leognan (FR); Jeremie Ardilouze, Le Bouscat (FR); Francis Bonnaud, Bordeaux (FR); Isidro Nieto, Saint Medard en Jalles (FR)

(73) Assignee: Saft, Bagnolet (FR)

( * ) Notice: Subject to any disclaimer, the term of this patent is extended or adjusted under 35 U.S.C. 154(b) by 396 days.

(21) Appl. No.: 12/359,057

(22) Filed: Jan. 23, 2009

(65) Prior Publication Data

US 2009/0189568 A1  Jul. 30, 2009

(30) Foreign Application Priority Data

Jan. 29, 2008  (FR) .................................. 08 00464

(51) Int. Cl.
*H02J 7/04* (2006.01)
*H02J 7/00* (2006.01)
(52) U.S. Cl. ........ 320/134; 320/106; 320/107; 320/124; 320/136
(58) Field of Classification Search ........... 320/132–160
See application file for complete search history.

(56) References Cited

U.S. PATENT DOCUMENTS

| 4,163,934 | A | * | 8/1979 | Lawn | 320/160 |
|---|---|---|---|---|---|
| 5,909,103 | A | * | 6/1999 | Williams | 320/134 |
| 6,074,775 | A | | 6/2000 | Gartstein et al. | |
| 6,075,343 | A | * | 6/2000 | Hsu | 320/134 |
| 2005/0007071 | A1 | | 1/2005 | Colberg et al. | |
| 2009/0072791 | A1 | * | 3/2009 | Morita et al. | 320/134 |
| 2010/0264870 | A1 | * | 10/2010 | Despesse | 320/103 |
| 2011/0279088 | A1 | * | 11/2011 | Yamamoto et al. | 320/134 |

FOREIGN PATENT DOCUMENTS

| EP | 0 695 017 A2 | 1/1996 |
|---|---|---|
| JP | 6113469 | 4/1994 |
| JP | 10-201129 | 7/1998 |
| JP | 2000-224769 | 8/2000 |

OTHER PUBLICATIONS

European Search Report corresponding to European Application No. 09 29 0026, completed Aug. 4, 2010.

* cited by examiner

*Primary Examiner* — Jermele M Hollington
*Assistant Examiner* — Emily Chan
(74) *Attorney, Agent, or Firm* — Sughrue Mion, PLLC (57) ABSTRACT

An electronic system for a battery designed to supply electrical power to an application, such as in an aircraft, that includes a main power supply, comprises a charging circuit (30) with a charger (K3C), a first battery discharging circuit (20) in parallel with the charging circuit, a component ensuring continuity of discharge (D3) and an electronic control unit adapted to control opening and closing of the discharge switch (K2) and adapted to control said charger (K3C). The control unit keeps the battery charged as long as it is not being called on to discharge and interrupts battery charging and sets the discharge switch (K2) to the closed position when a call for power is detected from the application, the component ensuring continuity of discharge (D3) allowing passage of a discharge current during a transitional phase of closing of the discharge switch (K2).

16 Claims, 6 Drawing Sheets

ELECTRONIC SYSTEM FOR A BATTERY

BACKGROUND OF THE INVENTION

The present invention relates to an electronic system for a battery comprising a least one sealed storage cell.

An electrochemical cell or storage cell (these two terms being equivalent, the term storage cell will be used hereinafter) is a device for producing electricity in which chemical energy is converted into electrical energy. The chemical energy is constituted by electrochemically active compounds deposited on at least one face of electrodes arranged in the storage cell. The electrical energy is produced by electrochemical reactions during discharge of the storage cell. The electrodes, arranged in a container, are electrically connected to current output terminals to provide electrical continuity between the electrodes and an electrical consumer with which the storage cell is associated.

The battery is designed to supply electrical energy to an external application; a charging circuit is consequently generally provided to which the battery can be connected in order to recharge the cells. To increase output power, it is known to associate several sealed cells in order to form a battery. The battery then comprises one or several parallel branches of cells connected in series. Battery charge and discharge management can then be arranged and controlled in order to balance charging and discharge of the various cells one with respect to the others. A control circuit, which may be more or less complex depending on the application, is generally provided to be associated with the battery.

In those applications employing a battery for standby power, it is essential for the cells to be charged to their full capacity prior to use, but, above all, for power to be instantaneously available.

Aircraft or other transport vehicles generally employ lead acid or nickel cadmium type (NiCd) batteries for starting the vehicle and for standby power. Such batteries can remain connected to the main power supply and be charged while demands are not being made on them; there is no fear of overcharging the cells. Now, it has appeared desirable to be able to employ lithium ion (Li-ion) type batteries as a standby battery, notably for application to aircraft in order to be able to benefit from the reduction in weight and ease of maintenance inherent to this type of battery. However, lithium ion type batteries require specific charging management in order to avoid any overcharging. It has indeed been observed that overcharging lithium ion storage cells leads to premature ageing of the battery. It is consequently not possible to directly replace a NiCd or lead acid battery by a lithium ion battery; an electronic battery management system needs to be provided for controlling charging and balancing of lithium ion cells.

Further, it is desirable for a standby battery to be able to deliver electrical energy to the application for which it is designed in a fast, reliable fashion without discontinuity when the main power supply of the application is subject to failure.

There is consequently a need for a battery which can be on charge permanently without the risk of overcharging while no demands are being made on it by the external application and which can supply electrical energy without discontinuity when demands are made on it.

SUMMARY OF THE INVENTION

To achieve this aim, the invention provides an electronic system for a battery, notably for a standby power battery, allowing management of cell charging so as to maintain an optimal state of charge without overcharging, and which allows reliable discharging to be ensured without any interruption of power when the battery is called on to supply power.

More particularly, the invention provides an electronic system for a battery designed to supply electrical power to an application that includes a main power supply, the electronic system comprising:
  a battery charging circuit comprising a charger;
  a first battery discharging circuit in parallel with said charging circuit and comprising a discharge switch;
  a component ensuring continuity of discharge;
  an electronic control unit adapted to control opening and closing of said discharge switch and adapted to control said charger;
  in which the control unit:
  ensures trickle charging of the battery as long as it is not being called on to discharge;
  interrupts battery charging and sets said discharge switch to the closed position when a call for power is detected from the application,
  and in which said discharge continuity ensuring component allows passage of a discharge current during a transitional phase of closing of said discharge switch.

In one embodiment, the discharge continuity ensuring component is provided in the charging circuit which constitutes a bi-directional branch. The charging circuit can comprise a charging switch provided in series with the charger and a diode provided in parallel with the charger, said diode allowing the battery to discharge when said charging switch is in the closed position and the charger is shut down.

In another embodiment, the discharge continuity ensuring component is a discharge diode provided in the battery discharging circuit in parallel with said discharge switch.

In another embodiment, the charging circuit does not allow a current greater than 80 A to pass.

In another embodiment, the control unit sets the discharge switch to the open position when a battery voltage becomes lower than the voltage of the application.

In another embodiment, the system further comprises a second battery discharging circuit in parallel with the first battery discharging circuit and comprising a second discharge switch maintained at a closed position, a resistor limiting flow of discharge current and a diode preventing the battery charging via the second discharge switch.

In other embodiments, the resistor of the second battery discharging circuit can limit discharge current to 5 A; and the second discharge switch can be maintained in the closed position as long as the battery state of charge is greater than 20%.

In another embodiment, the system further comprises a third battery discharging circuit in parallel with said first battery discharging circuit and comprising a third discharge switch which is set to a closed position upon a starting-up phase of the application being detected. The third discharge switch can allow a current greater than 1500 A to flow.

In another embodiment, the system further comprises a safety switch provided in series with said charging circuit and in series with the first battery discharging circuit and set to an open position when a situation dangerous to the user of the battery is detected. The safety switch is arranged in parallel with the second battery discharging circuit.

The invention further provides a rechargeable battery comprising at least one sealed electrochemical cell and an electronic system according to the invention.

The sealed cell can be of the lithium ion type. The invention also provides the use of this battery for an aircraft.

Further characteristics and advantages of the invention will become more clear from reading the description which follows provided by way of example and with reference to the attached drawings, in which:

DETAILED DESCRIPTION OF PREFERRED EMBODIMENTS

The invention provides an electronic system for a battery comprising at least one rechargeable electrochemical cell. The battery is permanently connected to a power bus of a main power supply of the application to which the battery is intended. The electronic system of the invention controls charging of the cells in order to avoid any overcharging and guarantees continuity of electric power availability when the battery is called upon to discharge.

The invention applies notably to a standby power or backup battery, in other words a battery intended to supply electrical energy to an external application should a main power supply fail. The battery can also be called upon to start up an auxiliary power unit (APU) of the application. The application can be a vehicle, for example an aircraft.

Figure 1:
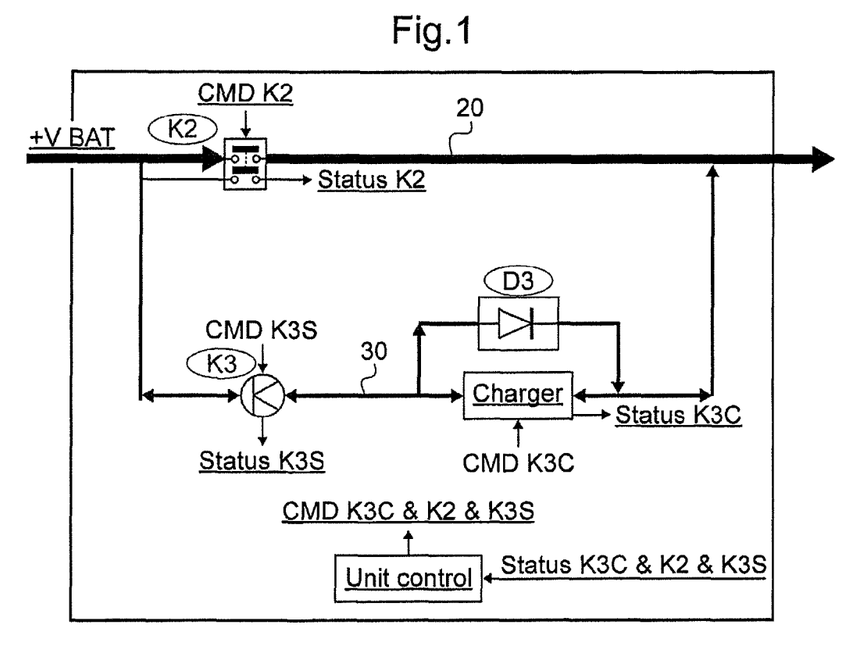
FIG. 1 is a diagram of the electronic system according to the first embodiment of the invention.
Figure 2:
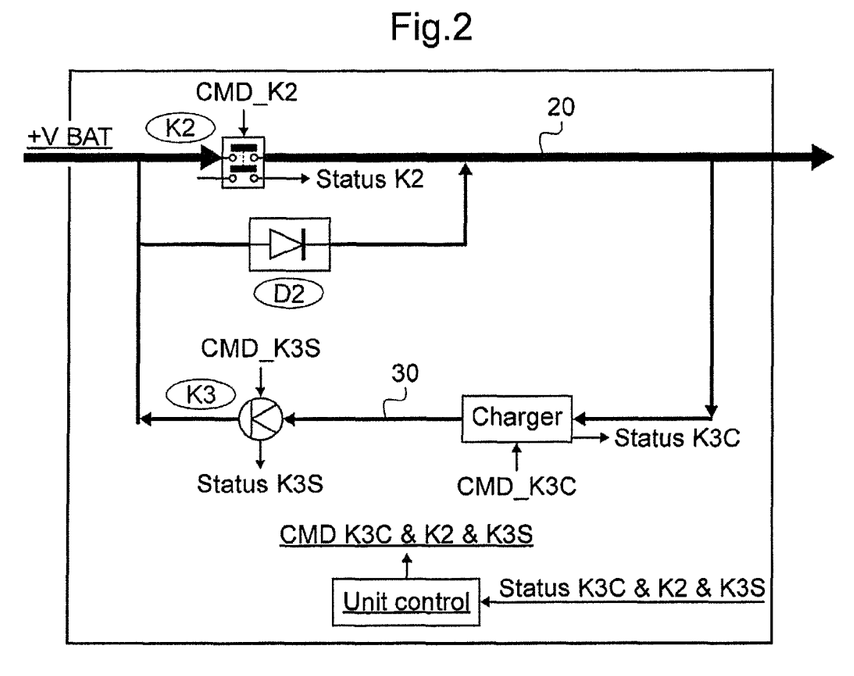
FIG. 2 is a diagram of the electronic system according to a second embodiment of the invention.

FIGS. 1 and 2 illustrated diagrammatically a first and second embodiments of the invention. The electronic system in FIGS. 1 and 2 comprise a battery discharging circuit 20 and a charging circuit 30 which are in parallel, meaning that the battery can be permanently charged from the main power supply and can immediately supply electrical energy when called upon to discharge by the application. The electronic system of the invention also comprises a discharge continuity component constituted by a diode D2 or D3 and which can be arranged in the charging circuit (FIG. 1) or in the discharging circuit (FIG. 2).

Battery discharging circuit 20 comprises a power line allowing current to flow from the battery to the application, and a switch K2 provided in this power line. Switch K2 is kept in the open position as long as the battery is not called upon to discharge by the application, and is operated to a closed position when electrical power is required by the application. Here, "open position" means that the switch is in a position preventing any passage of current and "closed position" means that the switch is in a position allowing current to flow. Battery discharging circuit 20 can further comprise a diode D2 connected in parallel with switch K2 (FIG. 2). This diode D2 prevents any charging current flowing from the application to the battery and makes it possible to ensure continuity of availability of power during the transition phase before switch K2 closes.

Charging circuit 30 comprises a charger and can include a diode D3 connected in anti-parallel. In the embodiment shown in FIG. 1, charging circuit 30 is a bi-directional branch, in other words it allows an electrical current to flow from the application to the battery for charging purposes but also allows current to flow from the battery to the application to provide discharge during a transition phase. Diode D2 of discharging circuit 20 is then no longer necessary.

In FIG. 1, transition discharge by the charging circuit is ensured by diode D3; however this diode can be replaced by a suitable circuit incorporated in the charger. In one embodiment, the charger can incorporate a simple switch K3C operated to the closed position to allow charging current to flow and operated to an open position when charging should be interrupted; diode D3 then provides flow of discharge current during the transition phase, in other words the time needed for switch K2 to pass to the closed position. In one embodiment, the charger can incorporate a more complex circuit allowing bi-directional passage of current depending on application of the command. Current limiting during discharge can be provided by a switch K3S. This switch further provides redundancy for switch K3C in the case of failure of the charger during a charging phase of the battery. Switch K3S is optional and depends on the desired level of security.

Battery discharging circuit 30 does not allow heavy currents to pass, for example currents greater than 80 A, which are needed when the main power supply has become faulty. Discharge switch K3S is not designed for heavy currents and passage through diode D3 introduces an impedance which limits the current available for the application. Discharge through charging circuit 30 is consequently transitory and only makes it possible to guarantee immediate current availability while waiting for discharge switch K2 to be operated to the closed position.

In one embodiment illustrated in FIG. 2, discharge in transition is provided by diode D2 which ensures passage of a discharge current during the transition phase, in other words the time for switch K2 to switch over to the closed position. In this embodiment, charging circuit 30 is no longer a bi-directional branch, in other words it does not allow electrical current to flow from the application to the battery, for charging.

The electronic system of the invention also comprises an electronic control unit which supervises operation of the battery in order to regulate cell charging and authorize discharge of the battery when the application so requires. Such a control unit receives information from the application itself (voltage of the main power supply, temperature, alarm for switch over to standby power mode, and so on), from sensors provided in the battery (example measuring voltage, current and temperature of each cell) and information concerning the status (open or closed position) of the various switches of the electronic system. The electronic control unit can also ensure maintenance of battery charge without a risk of overcharging; it can also detect a need for electrical power coming from the application and control shutdown of the charger and operation of switch K2 of the battery discharging circuit.

The charger of charging circuit 30 is connected to the main power supply of the application. For example, in the case of usage as a battery an aircraft or drone, the charger is connected to the aircraft 28V network in order to ensure the battery is maintained charge at around 100% of its capacity. In the case of a lithium ion type battery, the charger limits charging current to avoid any deposition of lithium on the electrodes. The electronic control unit control is not only charger switch K3C but also charging switch K3S, if present, and ensures control of charge voltage at around 4 V per cell of the battery. The electronic control unit receives a signal regarding status (open or closed position) of the various switches: K3S_status, K3C_status and K2_status.

Figure 3:
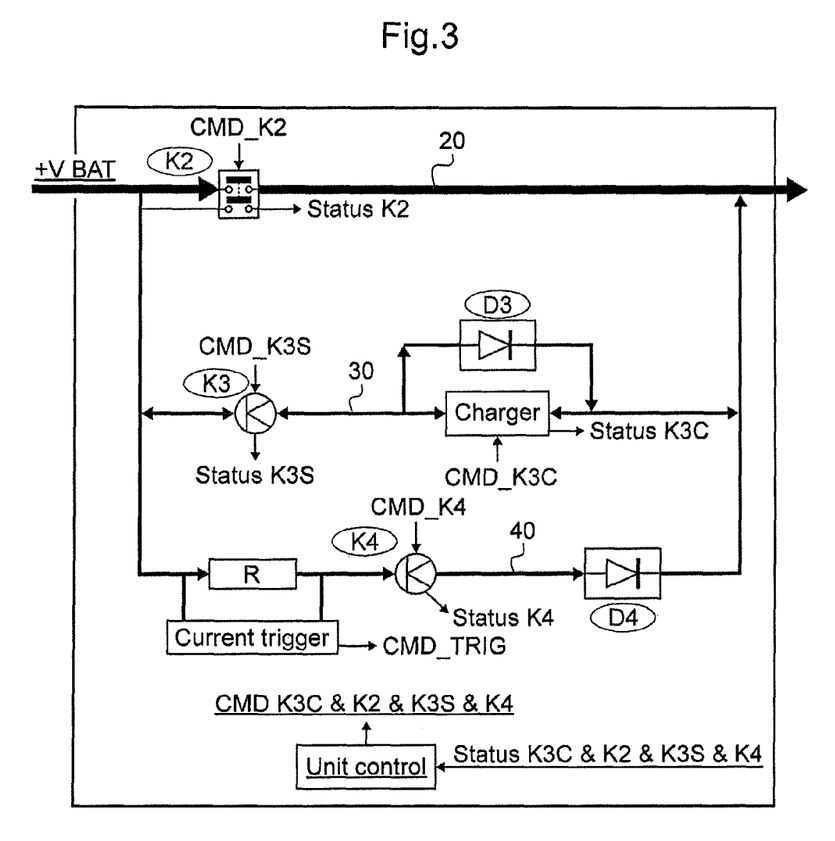
FIG. 3 is a diagram of the electronic system according to a third embodiment of the invention.

FIG. 3 shows diagrammatically a third embodiment of the invention. Those components that are identical to the first embodiment bear the same reference numerals and their description will not be repeated.

FIG. 3 shows a second battery discharging circuit 40, in parallel with the first battery discharging circuit 20. This second battery discharging circuit 40 comprises a second discharge switch K4 which is maintained in the closed position and resistor R which limits the flow of current through this second discharging circuit. Diode D4 prevents the battery charging via this second discharge switch K4.

This second discharging circuit 40 allows the battery to be used at low currents, notably when the electronics of the main charging 30 and discharge 20 branches are asleep in standby mode, in other words with switches K2, K3C and K3S in the open position. For example, for use as an aircraft battery, when the aircraft is on the ground, the second discharging circuit 40 can be used for powering the emergency lighting while the aircraft is being serviced without the need to wake up all of the battery control electronics which would lead to more power being consumed than the power requirements of the application. Resistor R, associated with a current trigger makes it possible to limit discharge current flow in this branch 40 to around 5 A. Such a current is consequently insignificant when the battery is discharged via its main branch 20 but sufficient for care and maintenance applications on the ground. Such a current also represents negligible leakage when the battery is charged by charging circuit 30. If the application calls for a heavier current, the electronic control unit of the system wakes up the other branches and operates discharge switch K2, operating it in the closed position.

The second discharge switch K4 still remains in the closed position; the electronic control unit does consequently not need to set it to the closed position and this discharge branch 40 can be employed when the electronic system is in standby mode. The second discharge switch K4 will be set to the open position if a state of charge (SOC) less than 20% is detected, in order to eliminate any leakage current.

Figure 4:
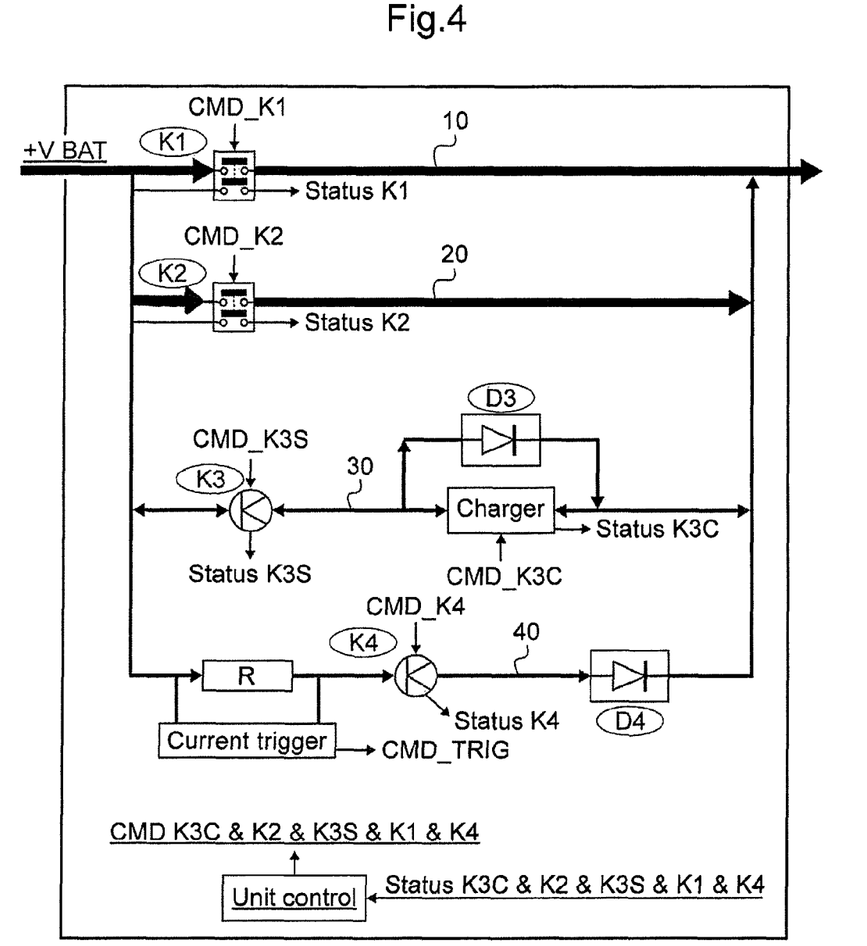
FIG. 4 is a diagram of the electronic system according to a fourth embodiment of the invention.

FIG. 4 shows diagrammatically a fourth embodiment of the invention. Those parts which are identical to the first and second embodiments bear the same reference numerals and their description will not be repeated.

FIG. 4 shows a third discharging circuit 10, in parallel with the first discharging circuit 20. This third battery discharging circuit 10 comprises a third discharge switch K1 which is kept in the open position and is set to the closed position when demands are made on the battery by the application for a start-up phase. FIG. 4 shows the third discharging circuit 10 added to the second discharging circuit 40 illustrated in FIG. 3, but, obviously, this third discharging circuit 10 could be added to the systems illustrated in FIG. 1 or 2, without provision being made for the second discharging circuit 40.

When the auxiliary power unit APU is being started up, very heavy currents are required over a short period; for example, currents as high as 1500 A during less than 10 seconds are called upon to flow from the battery to the application. Such currents create significant electrical arcs when the switches are opened, and accelerate ageing of these switches. This third discharging circuit 10 makes it possible to preserve switch reliability, notably reliability of discharge switch K2 of the first discharging circuit 20 which will be used in a battery standby power mode. The third switch K1 can have the same technical specifications as those of switch K2 of the first discharge circuit 20, or exhibit enhanced robustness characteristics. Third switch K1 allows currents greater than 1500 A to flow and the switch K2 of the main discharging circuit 20 can be preserved from flow of such heavy currents.

Figure 5:
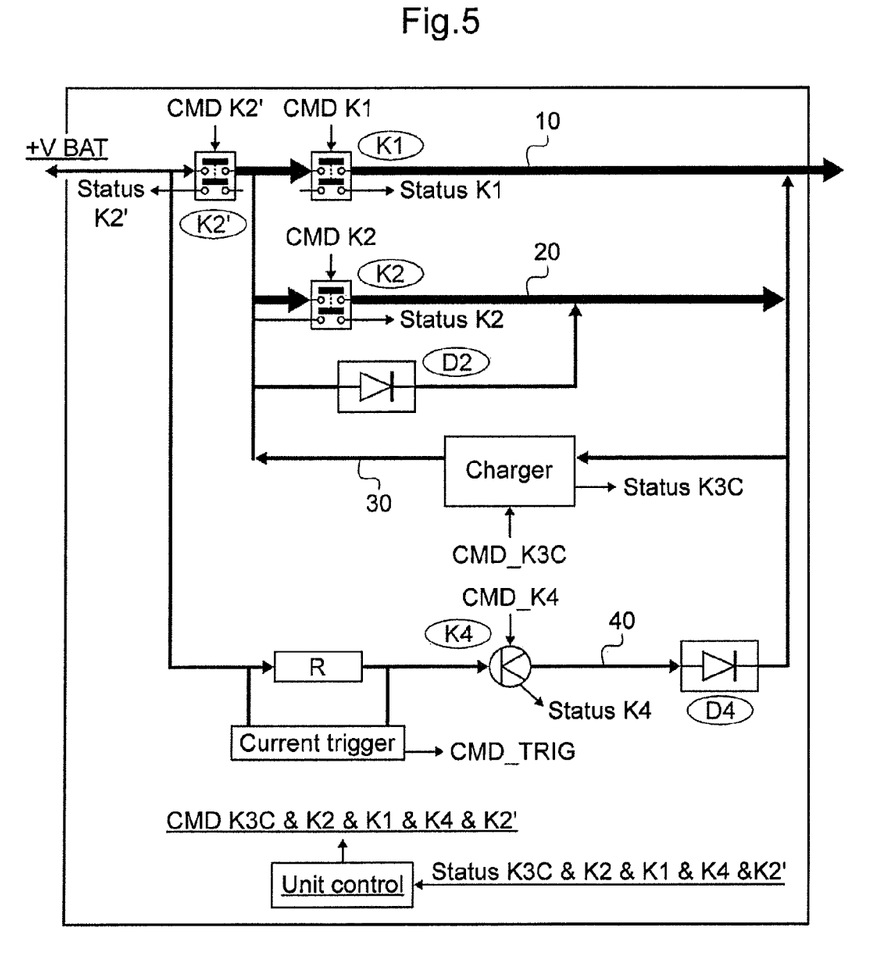
FIG. 5 is a diagram of the electronic system according to a fifth embodiment of the invention.

FIG. 5 illustrates diagrammatically a fifth embodiment of the invention. Those parts which are identical to those of the three embodiments described above bear the same reference numerals and their description will not be repeated.

In this fifth embodiment, a safety switch K2' has been added in series with charging circuit 30 and in series with the first discharging circuit 20. FIG. 5 shows the four branches of the system of FIG. 4 except that battery discharge during a transitional period is handled by the diode D2 of discharging circuit 20 instead of being handled by diode D3 of the charging circuit 30. It will nevertheless be obvious that battery discharge during a transitional period could be handled by diode D3 of charging circuit 30, as was the case in FIG. 4. It will be understood that this safety switch K2' could also be added to the systems illustrated in one of FIGS. 1 to 3.

Optionally, safety switch K2' is in series with third heavy current discharging circuit 10 but is in parallel with the second low current discharging circuit 40. Safety switch K2' is kept in the closed position and switched to the open position if a battery fault is detected, creating a dangerous situation for the user. It constitutes a redundancy for switches K1, K2, K3C and K3S.

In standby mode, safety switch K2' is also in the open position. This is the reason why second low current discharging circuit 40 should be in parallel with safety switch K2'. The presence of safety switch K2' also makes it possible to ensure that battery discharge during a transitional period is either via diode D2 of discharging circuit 20, or via diode D3 of charging circuit 30. Indeed, without the presence of safety switch K2', the presence of a diode D2 in parallel with discharge switch K2 would guarantee a discharge current in standby mode, and would eliminate the need for a second discharge branch 40.

In FIG. 5, discharge switch K3S has been withdrawn from discharging circuit 30. Indeed, as battery discharge during a transitional period is ensured by diode D2 of charging circuit 20, switch K3S is no longer necessary to provide discharge current limitation through charging circuit 30. Further, redundancy for switch K3C should the charger fail during the battery charging phase can be provided by safety switch K2'. Obviously, discharge switch K3S could nevertheless still be present, depending on the degree of safety required.

Indeed, should one of these switches K1, K2, K3S or K3C fail and remain in a closed position while the main power supply of the application is in operation, one could be faced with a use putting the battery in a dangerous situation, deterioration of the battery meaning that it would no longer be operational in standby mode. Switch K2' would then be set to the open position by the control electronics. K2' remains in a closed position as long as no situation dangerous to the user has been detected, except during periods of storage of the battery.

The electronic system of the invention operates as follows.

Figure 6:
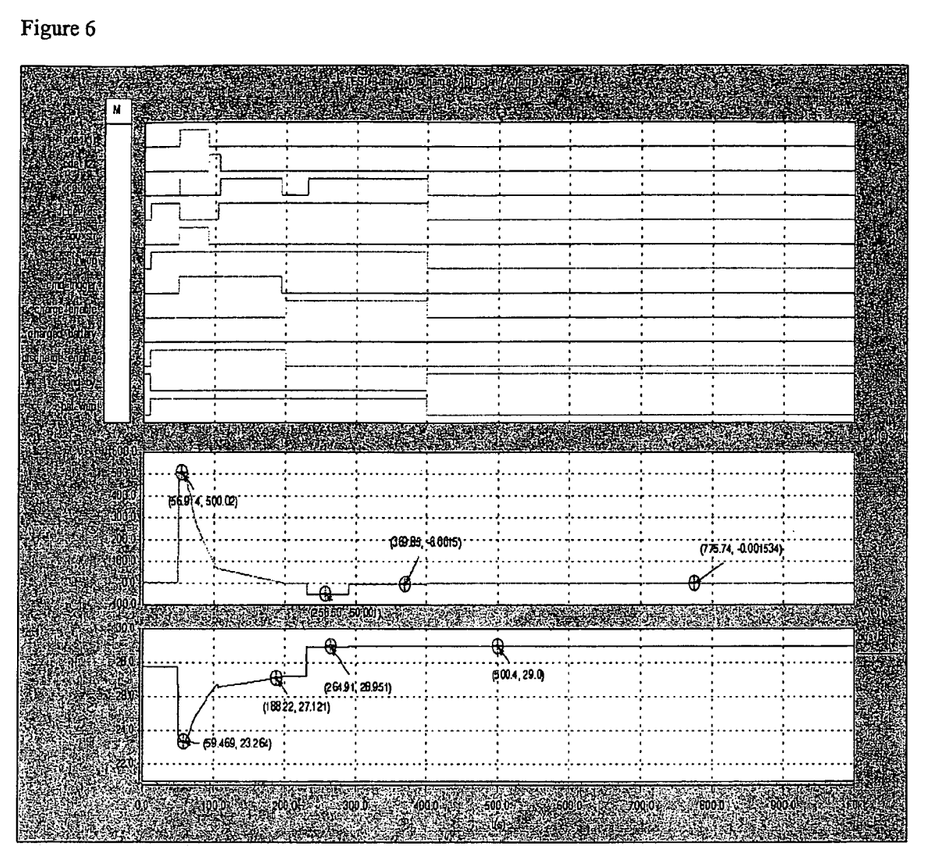
FIG. 6 shows graphs illustrating a state of the switches, the pattern of current supplied by the battery and the pattern of voltage at the battery terminals during a simulation of start-up of the application with a battery comprising an electronic system according to the fourth embodiment of the invention.

The graphs in FIG. 6 illustrate a simulation of the electronic system of the invention in a phase in which the application is being started followed by a recharging of a battery and setting to standby mode. The simulation in FIG. 6 was done with an electronic system such as the one illustrated in FIG. 4. The first graph shows the state of the switches: state "0" corresponds to a switch being open and state "1" corresponds to a closed position of the switch. Second discharge switch K4 and safety switch K2' are not illustrated here, since they remain at the same state except in fringe cases of very low state of charge, or of failure of the other switches, as explained above. The second graph illustrates the current supplied by the battery and the third graph shows battery terminal voltage.

The battery is initially charged to full capacity; its voltage is substantially equal to that of the main 28V power supply network of the application, and it neither supplies nor receives any current. The charger is shut down (switch K3C in the open position) and discharge switch K2 is open. Charging switch K3S is, on the other hand, in the closed position; should the application call for current, even before one of discharge switches K1 or K2 is operated, discharge will be possible via diode D3 of charging circuit 30. Charging of the battery nevertheless remains impossible as long as charger switch K3C has not been operated. Immediate current availability is consequently ensured.

In order to start up auxiliary power unit APU, the electronic control unit will command closing of third discharge switch K1 to enable a heavy current to flow and opening of charging switch K38 to avoid any possibility of current flowing back towards the battery. When the current requirement surge diminishes, falling below 100 A for example, first discharging circuit 20 takes over from third discharging circuit 10, to supply electric power to the application; the first discharge switch K2 is set to the closed position and the third discharge switch K1 is set to the open position. Discharge can be conducted at extremely high powers when compared to charging, without any loss of power when the battery is called on to do service. The dissymmetry between currents available on charge when compared to discharge is due to Li-ion electrochemistry and the possibility that lithium can get deposited when charging is too fast, which would considerably reduce performances and battery lifetime.

When starting up of the APU has finished and the main power supply of the application is activated, the battery can be recharged. Discharge switch K2 is set back to the open position, charge switch K3S is set to the closed position. Charger switch K3C will be operated if the voltage on the power supply network is higher than the battery voltage. Battery charging now becomes possible from the main power supply network. Charging is regulated by opening and closing of switch K3C of the charger, with charging switch K3S remaining in the closed position. Once the battery has reached a SOC, state of charge, of 100%, charging is broken off and the electronic system is set to standby mode with switches K1, K2, K3S and K3C in the open position. Only second discharge switch K4 remains closed in standby mode.

Figure 7:
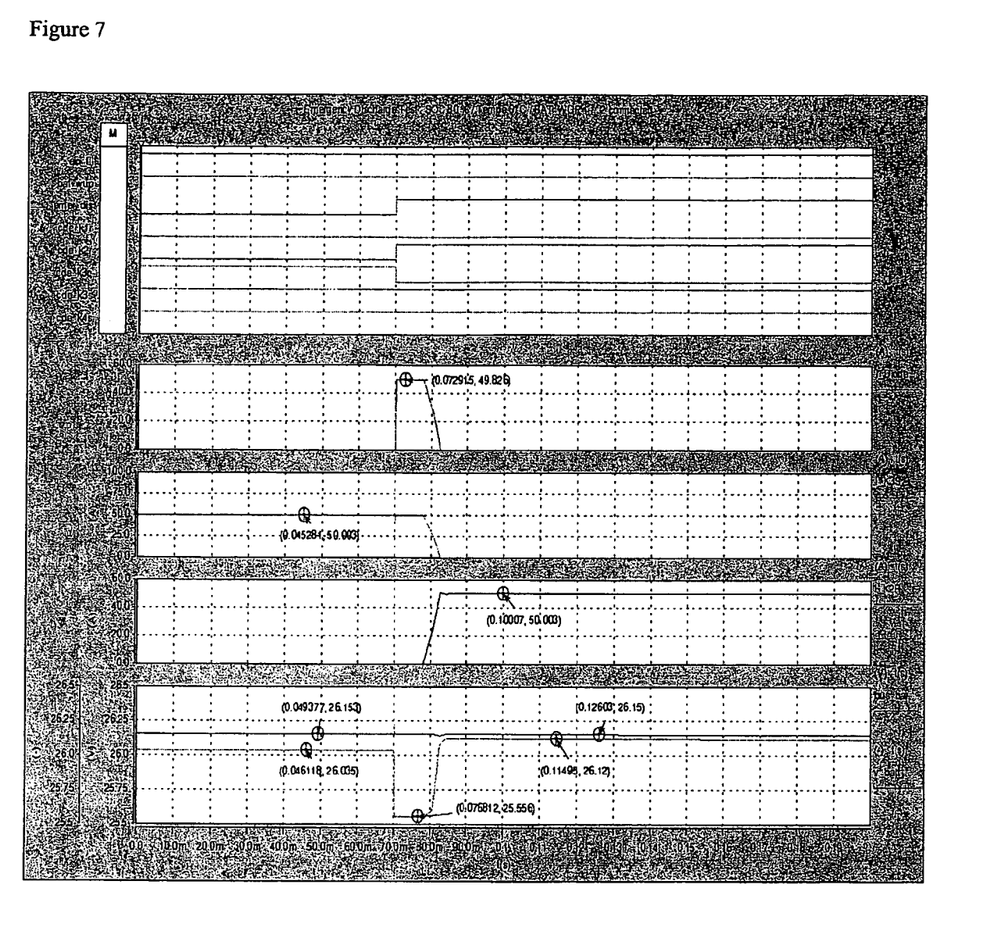
FIG. 7 shows graphs illustrating a state of the switches, the pattern of current supplied by the battery and the pattern of the voltage at the terminals of a battery during a simulation in standby mode with a battery comprising an electronic system according to the fourth embodiment of this invention.

The graphs in FIG. 7 illustrate a simulation of the electronic system of the invention in a phase where it is providing standby power to the application. The simulation in FIG. 6 was done with an electronic system as illustrated in FIG. 4. The first graph shows the state of the switches, the second graph shows the current supplied via the transition diode, the third graph shows the current through the charging branch, the fourth graph shows the current through the discharge branch, and the last graph shows the battery terminal voltage.

The battery is initially charged with a SOC of 80%; the charge maintains the charge (switch K3C in the closed position), charging switch K3S is in the closed position and discharge switch K2 is in the open position. Upon detecting a failure of the main power supply, for example when the electronic control unit detects a drop in voltage in the main electrical network (as illustrated on the last graph) or receives any other alarm signal, the electronic control unit will command discharge switch K2 to close and charger switch K3C to open, to stop charging. A discharge current will have however already been able to flow from the battery to the application as soon as the main power supply voltage drops, even before closing of discharge switch K2 is effective, thanks to diode D3 of charging circuit 30. Immediate availability of current from the battery is consequently provided during a transitional period of 10 to 20 ms. Charging circuit 30 does however not allow heavy current to pass. When discharge switch K2 goes to the closed position, the current flows through discharging circuit 20 the impedance of which is lower than that of charging circuit 30.

As long as the electronic control unit is detecting standby power mode, it will keep charging switch K3S open and will inhibit all security provisions on the battery in order not to hinder availability of current from the standby power battery.

Under certain circumstances, the voltage at the application can come to exceed the battery voltage while the standby power mode is still active, for example as a result of the battery reaching a relatively low state of charge compared to the tension of the main power supply. The battery could then enter a charging phase with current flowing from the application to the battery through the power line of discharging circuit 20.

It is desirable to avoid such a situation. This is achieved by the electronic control unit which if it detects a battery voltage which is lower than that of the application's network while standby power mode is active, will cause discharge switch K2 to open to prevent the battery being recharged from the application the main power supply of which is defective. As soon as discharge becomes possible again, and even before discharge switch K2 has closed again, the electric power from the battery is again available via the charging circuit diode D3. Any break in the availability of power is thus avoided.

Further, when a state of charge SOC below 20% is detected, the electronic control unit will command all the switches of the battery to open, including the second discharge switch K4 in order to prevent excessive discharge of the battery cells.

The standby power battery according to the invention can thus be kept in a state of charge close to 100% permanently from the main power supply of the application, as long as demands are not made on it to provide standby power or to start up the APU. One particular application of such a standby power battery can be envisaged for aircraft and notably for long-range drones which do require considerable capacity; the standby power battery can be charged by the aircraft's main power supply as long as the latter is operational, and can supply electrical energy to the aircraft as soon as needed, without any break in power.

The embodiments discussed above and the drawings should be considered as having been provided by way of non-limiting examples, and the invention is not intended to be limited to the details provided here but can be modified while still remaining within the scope of the attached claims. In particular, this description has made reference to Li-ion type cells, but any other electrochemical couple could be employed. Similarly, the switches can be of any known type and the electronic unit can be programmed to control battery charging and discharge with voltage and current values that are different from those given in the examples.

The invention claimed is:

1. An electronic system for a battery designed to supply electrical power to an application that includes a main power supply, the electronic system comprising:
a battery charging circuit comprising a charger;
a first battery discharging circuit in parallel with said charging circuit and comprising a discharge switch;
a component ensuring continuity of discharge;
an electronic control unit adapted to control opening and closing of said discharge switch and adapted to control said charger;
in which the control unit:
ensures trickle charging of the battery as long as it is not being called on to discharge;
interrupts battery charging and sets said discharge switch to the closed position when a call for power is detected from the application,
and in which said component ensuring continuity of discharge allows passage of a discharge current during a transitional phase of closing of said discharge switch.

2. The electronic system of claim 1, in which the discharge continuity ensuring component is provided in the charging circuit which constitutes a bi-directional branch.

3. The electronic system according to claim 2, in which the charging circuit comprises a charging switch provided in series with the charger and a diode provided in parallel with the charger, said diode allowing the battery to discharge when said charging switch is in the closed position and the charger is shut down.

4. The electronic system according to claim 1, in which the discharge continuity ensuring component is a discharge diode provided in the battery discharging circuit in parallel with said discharge switch.

5. The electronic system according to claim 1, in which the charging circuit does not allow a current greater than 80 A to pass.

6. The electronic system according to claim 1, in which the control unit sets the discharge switch to the open position when the battery voltage becomes lower than the voltage of the application.

7. The electronic system according to claim 1, further comprising a second battery discharging circuit in parallel with the first battery discharging circuit and comprising a second discharge switch maintained in a closed position, a resistor limiting flow of discharge current and a diode preventing the battery charging via the second discharge switch.

8. The electronic system according to claim 7, in which the resistor of the second battery discharging circuit limits discharge current to 5 A.

9. The electronic system according to claim 7, in which the second discharge switch is maintained in a closed position as long as a battery state of charge is greater than 20%.

10. The electronic system according to claim 1, further comprising a third battery discharging circuit in parallel with said first battery discharging circuit and comprising a third discharge switch which is set to a closed position upon a starting up phase of the application being detected.

11. The electronic system according to claim 10, in which the third discharge switch allows a current greater than 1500 A to flow.

12. The electronic system according to claim 1, further comprising a safety switch provided in series with said charging circuit and in series with the first battery discharging circuit and set to an open position when a situation dangerous to the user of the battery is detected.

13. The electronic system according to claim 12, further comprising a second battery discharging circuit in parallel with the first battery discharging circuit and comprising a second discharge switch maintained in a closed position, a resistor limiting flow of discharge current and a diode preventing the battery charging via the second discharge switch, in which the safety switch is arranged in parallel with the second battery discharging circuit.

14. The electronic system according to claim 1, further comprising
a second battery discharging circuit in parallel with the first battery discharging circuit and comprising a second discharge switch maintained in a closed position, a resistor limiting flow of discharge current and a diode preventing the battery charging via the second discharge switch;
a third battery discharging circuit in parallel with said first battery discharging circuit and comprising a third discharge switch which is set to a closed position upon a starting up phase of the application being detected.

15. A rechargeable battery comprising:
at least one sealed electrochemical cell; and
an electronic system comprising:
a battery charging circuit comprising a charger;
a first battery discharging circuit in parallel with said charging circuit and comprising a discharge switch;
a component ensuring continuity of discharge;
an electronic control unit adapted to control opening and closing of said discharge switch and adapted to control said charger;
in which the control unit:
ensures trickle charging of the battery as long as it is not being called on to discharge;
interrupts battery charging and sets said discharge switch to the closed position when a call for power is detected from the application,
and in which said component ensuring continuity of discharge allows passage of a discharge current during a transitional phase of closing of said discharge switch.

16. The battery according to claim 15, in which the sealed cell is of the lithium ion type.

* * * * *